(12) United States Patent
Nakashima (10) Patent No.: US 6,754,167 B1
(45) Date of Patent: Jun. 22, 2004

(54) DISK CARTRIDGE

(75) Inventor: Hiroshi Nakashima, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/440,920

(22) Filed: Nov. 16, 1999

(30) Foreign Application Priority Data

Nov. 16, 1998 (JP) .......................................... 10-325480

(51) Int. Cl.⁷ ............................................. G11B 23/03
(52) U.S. Cl. ...................................................... 369/291
(58) Field of Search ........................... 369/291; 360/133

(56) References Cited

U.S. PATENT DOCUMENTS

| | | | |
|---|---|---|---|
| 4,443,874 A | * 4/1984 | Steenberg | .................... 369/291 |
| 4,532,564 A | 7/1985 | Larson et al. | |
| 5,694,278 A | 12/1997 | Sumner | |
| 6,023,398 A | * 2/2000 | Tannert et al. | .............. 360/133 |
| 6,344,944 B2 | * 2/2002 | Stabile et al. | .................. 360/94 |

FOREIGN PATENT DOCUMENTS

| | | |
|---|---|---|
| EP | 0 918 329 | 8/1996 |
| GB | 2 274 939 | 8/1994 |
| JP | 03-142766 | 6/1991 |
| JP | 05-225743 | 9/1993 |
| JP | 7-006493 | 1/1995 |
| JP | 07-050084 | 2/1995 |
| JP | 08-235810 | 9/1996 |
| JP | 10-003769 | 1/1998 |
| JP | 10-502481 | 3/1998 |
| JP | 10-507568 | 7/1998 |
| WO | 96/12285 | 4/1996 |
| WO | 96/33493 | 10/1996 |
| WO | 96/41343 | 12/1996 |
| WO | 98/07153 | 2/1998 |
| WO | 99/41745 | 8/1999 |

* cited by examiner

*Primary Examiner*—George J. Letscher
(74) *Attorney, Agent, or Firm*—Hogan & Harston LLP

(57) ABSTRACT

The invention provides a disk cartridge 2 comprising a flat rectangular parallelepipedal cartridge body 20, and a disk 21 rotatably enclosed in the cartridge body 20. The cartridge body 20 comprises opposite side walls 2b, 2c formed in parallel to the direction of insertion of the cartridge into a disk player and a front wall 2a facing toward the direction of insertion, and has a shutter 3 slidable along the side wall 2b for exposing the signal bearing surface of the disk 21. The front wall 2a is in the form of a curved wall or polygonal wall having a central portion formed in the closest proximity to the outer periphery of the disk 21 and opposite side portions formed as retracted toward a direction opposite to the direction of insertion. The front wall thus shaped renders the cartridge body 20 compacted and readily indicates to the user the direction of insertion into the disk player.

4 Claims, 6 Drawing Sheets

DISK CARTRIDGE

FIELD OF THE INVENTION

The present invention relates to disk cartridges each containing a signal recording medium in the form of a disk, such as an optical disk, magnetic disk or optomagnetic disk.

BACKGROUND OF THE INVENTION

Figure 10:
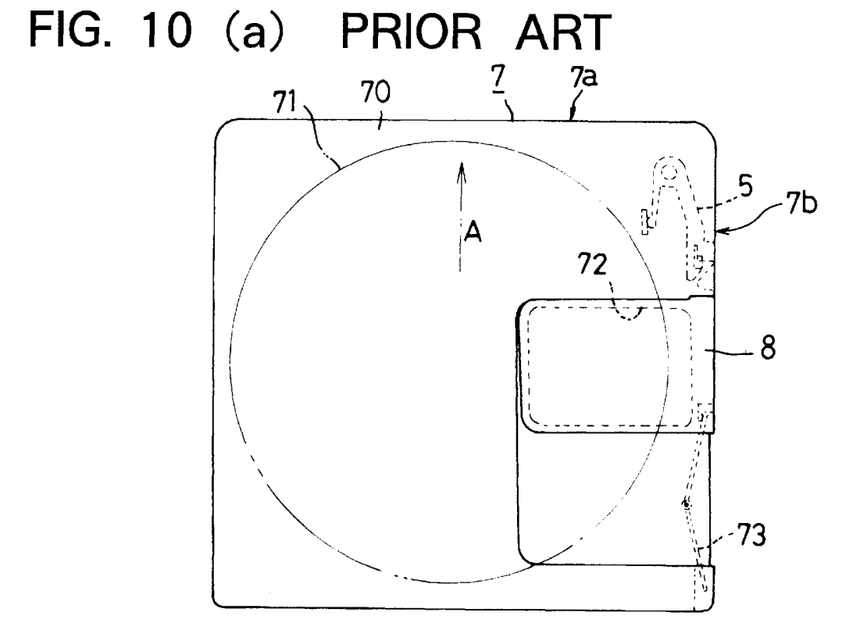
FIGS. 10(a) and 10(b) are a plan view and a bottom view, respectively, of the conventional disk cartridge.

A disk cartridge 7 comprising a flat rectangular parallelepipedal cartridge body 70 and a disk 71 enclosed in the cartridge body as shown in FIGS. 10(a) and 10(b) is conventionally used for optical disk players by which signals are optically recorded on or reproduced from optical disks or optomagnetic disks.

The cartridge body 70 is formed with a window 72 for exposing the signal bearing surface of the disk 71, and has a shutter 8 slidably attached to the body for opening and closing the window 72. Arranged inside the cartridge body 70 along a side wall 7b extending in the direction of sliding of the shutter 8 are a torsion spring 73 for biasing the shutter 8 in a closing direction, and a lock mechanism 5 for locking the shutter 8 in a closed position. The cartridge body 70 has a bottom wall formed with a first positioning cavity 74 and a second positioning cavity 75 for positioning the disk cartridge 7 in the recording-playback position to be described below.

Figure 9:
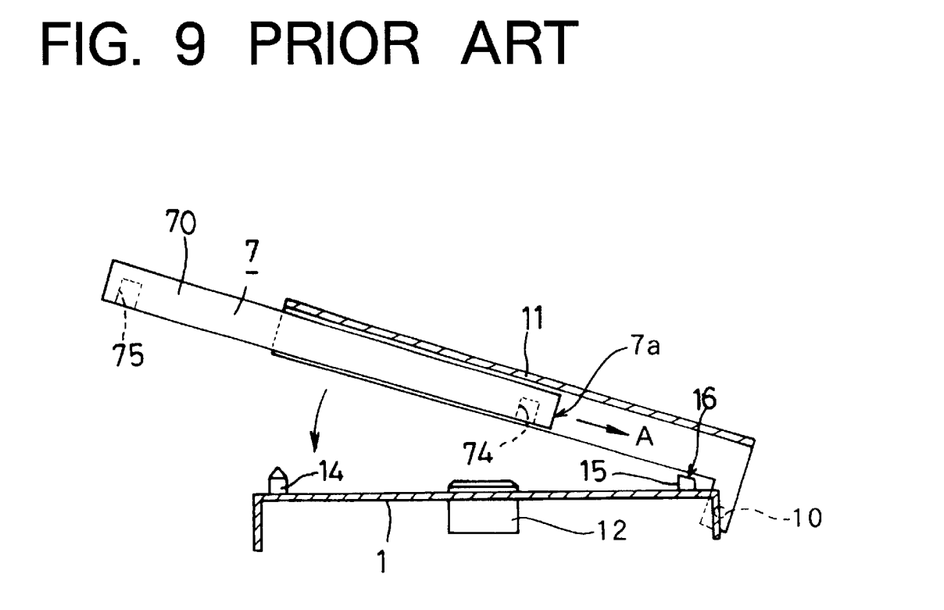
FIG. 9 is a side elevation partly broken away and showing a conventional disk cartridge as inserted into a cartridge holder of a disk player.

In the optical disk player for use with the disk cartridge 7 for recording signals on the disk therein or reproducing signals therefrom, a chassis 1 has mounted thereon a motor 12 for drivingly rotating the disk 71 of the disk cartridge 7, and a cartridge holder 11 for setting the disk cartridge 7 in the recording-playback position is supported on the chassis 1 so as to be movable upward and downward about a pivot 10 as shown in FIG. 9. Further provided on the chassis 1 are a first positioning pin 15 and a second positioning pin 14 which are insertable into the first and second positioning cavities 74, 75 to place the cartridge 7 in the recording-playback position on the chassis 1.

The shutter 8 of the disk cartridge 7 is usually locked in the closed position by the lock mechanism 5, whereas when the cartridge 7 is inserted into the cartridge holder 11 of the optical disk player as shown in FIG. 9, an unlocking mechanism (not shown) provided on the cartridge holder 11 releases the shutter 8 from the lock mechanism 5 with the advance of the cartridge 7 indicated by an arrow A in the drawing. When the cartridge 7 is further pushed into the holder 11, the unlocking mechanism pushes the shutter 8 open against the elasticity of the torsion spring 73 in the course of this movement.

The cartridge holder 11 is then depressed to an engaged position on the chassis 1, whereby the disk cartridge 7 in the holder 11 is set in the recording-playback position. At this time, the first positioning pin 15 and the second positioning pin 14 on the chassis 1 fit into the first positioning cavity 74 and the second positioning cavity 75 in the disk cartridge 7, whereby the cartridge 7 is positioned in place. The first positioning pin 15 on the chassis 1 has its head cut obliquely and is thereby formed with a slope 16 to avoid interference with the front wall 7a of the cartridge 7 when the cartridge 7 is advanced. Further the first positioning cavity 74 in the cartridge body 70 is in the form of an elongated cavity to avoid interference with the first positioning pin 15 due to the pivotal movement of the cartridge holder 11 [see FIG. 10(b)].

With the disk cartridge 7 set in the recording-playback position as described above, signals are recorded on or reproduced from the disk 71 through the window 72 of the cartridge body 70. When the disk cartridge 7 is thereafter ejected, the shutter 8 is allowed to move in the closing direction with the retraction of the cartridge 7 and closed by being biased by the torsion spring 73. The lock mechanism 5 then functions to lock the shutter 8 in the closed position.

In compliance with the demand in recent years for more compact disk players, attempts have been made to provide disks of higher recording density and reduced size for use in disk cartridges, and there arises a need to make the cartridge body 70 also compacted by positioning the four peripheral walls thereof as close as possible to the outer periphery of the disk 71. However, the disk cartridge externally so shaped as shown in FIGS. 10(a) and 10(b) and heretofore in wide use has the problem of being limited in size reduction.

Furthermore, the user is unable to realize the direction of insertion, shown by the arrow A, from the appearance of the conventional disk cartridge 7 of FIGS. 10(a) and 10(b), so that it is practice to print a mark on the surface of the cartridge for indicating the direction of insertion. Nevertheless, it is still difficult for the user to realize the direction of insertion.

Since the first positioning pin 15 provided on the chassis 1 of the disk player has the slope 16 formed by obliquely cutting the head as shown in FIG. 9, the first pin 15 is not only costly to make but has the problem that in mounting the first pin 15 on the chassis 1 for assembly, the pin 15, which has directionality, requires a larger number of steps and a higher cost than the second positioning pin 14 which has no directionality.

SUMMARY OF THE INVENTION

A first object of the present invention is to provide a disk cartridge which comprises a compacted cartridge body and which readily indicates the direction of insertion of the cartridge into the disk player.

A second object of the invention is to provide a disk cartridge for use in a disk player wherein all the positioning pins to be mounted on the chassis for assembly can be those so shaped as to have no directionality.

The present invention provides a disk cartridge which includes a cartridge body 20 comprising opposite side walls 2b, 2c formed in parallel to the direction of insertion of the cartridge into a signal recording-reproduction device, and a front wall 2a facing toward the direction of insertion, a shutter 3 being mounted on the cartridge body and slidable along one of the side walls. The front wall 2a is in the form of a curved wall or polygonal wall extending along the arc form of outer periphery of a disk 21 in the cartridge body and has a central portion formed in the closest proximity to the outer periphery of the disk 21 and opposite side portions formed as retracted toward a direction opposite to the direction of insertion.

With the disk cartridge of the present invention, the front wall 2a of the cartridge body 20 is in the form of a curved wall or polygonal wall along the arc form of the outer periphery of the disk 21, so that the cartridge body 20 can be smaller in size than the conventional rectangular cartridge body by the amount of retraction of the front wall side portions. Of the four peripheral walls of the cartridge body 20, the front wall 2a only has a curved or polygonal form projecting in the direction of insertion. The overall appearance of the cartridge body 20 therefore readily indicates the direction of insertion.

Usable as the front wall 2a of the cartridge body 20 are, for example:

a cylindrical wall having a center of curvature on the center line of the disk 21 extending through the center of rotation of the disk in the opposite direction to the insertion direction or on the center line of the cartridge body 20 extending in parallel to the disk center line, a wall comprising a cylindrical wall portion having a center of curvature on the center line of the disk 21 extending through the center of rotation of the disk in the opposite direction to the insertion direction or on the center line of the cartridge body 20 extending in parallel to the disk center line, and a planar wall portion formed at each of opposite sides of the cylindrical wall portion and orthogonal to the direction of insertion, and a wall comprising a central planar wall portion formed in the central portion thereof and orthogonal to the direction of insertion, and opposite side planar wall portions positioned as retracted from the central planar wall portion respectively at opposite sides thereof and orthogonal to the direction of insertion.

When the cylindrical wall serving as the front wall 2a has the center of curvature thereof positioned on the disk center line, the clearance between the front wall 2a and the disk outer periphery can be minimized, whereby the cartridge body 20 can be further compacted.

As a specific embodiment of the invention, the cartridge body 20 has a first positioning cavity 24 and a second positioning cavity 25 formed in a bottom surface thereof to be opposed to a cartridge support surface of the signal recording-reproduction device and located respectively at front and rear positions along the direction of insertion, the cartridge support surface being provided with two positioning pins fittable in the respective positioning cavities, the front first positioning cavity 24 having an opening in the front wall 2a and having a U-shaped inner peripheral surface extending from the opening in the opposite direction to the direction of insertion.

According to the embodiment wherein the first positioning cavity 24 has an opening in the front wall 2a of the cartridge body 20, the head of the first positioning pin enters the cavity 24 through the opening and reaches the innermost portion of the cavity when the disk cartridge 2 is inserted into the cartridge holder of the signal recording-reproduction device, even if the first positioning pin is in the form of a solid cylinder having no slope formed by cutting its head. The solid cylindrical first positioning pin is easy and inexpensive to make. Since the pin has no directionality to be considered when the pin is to be mounted on the chassis for assembly, the pin is easy to install to ensure a reduction in assembling cost.

With the disk cartridge embodying the invention, the front wall 2a of the cartridge body 20 is in the form of a curved wall or polygonal wall as described above. This feature renders the cartridge body 20 compacted, further readily indicating the direction of insertion of the cartridge into the signal recording-reproduction device.

Of the two positioning cavities formed in the bottom surface of the cartridge body 20, the front first positioning cavity is in the form of a U-shaped groove having an opening in the front wall 2a. This makes it possible to use only the positioning pins which have no directionality to be considered in installing the pins on the chassis.

DETAILED DESCRIPTION OF EMBODIMENTS

Embodiments of the invention will be described below in detail with reference to the drawings.

Figure 1:
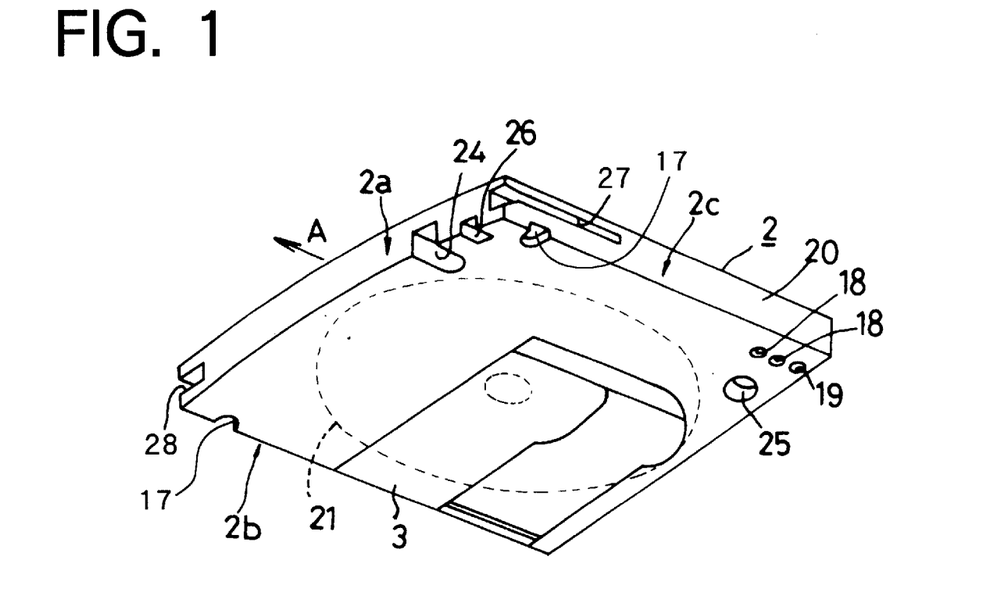
FIG. 1 is a perspective view of a disk cartridge embodying the invention.
Figure 2:
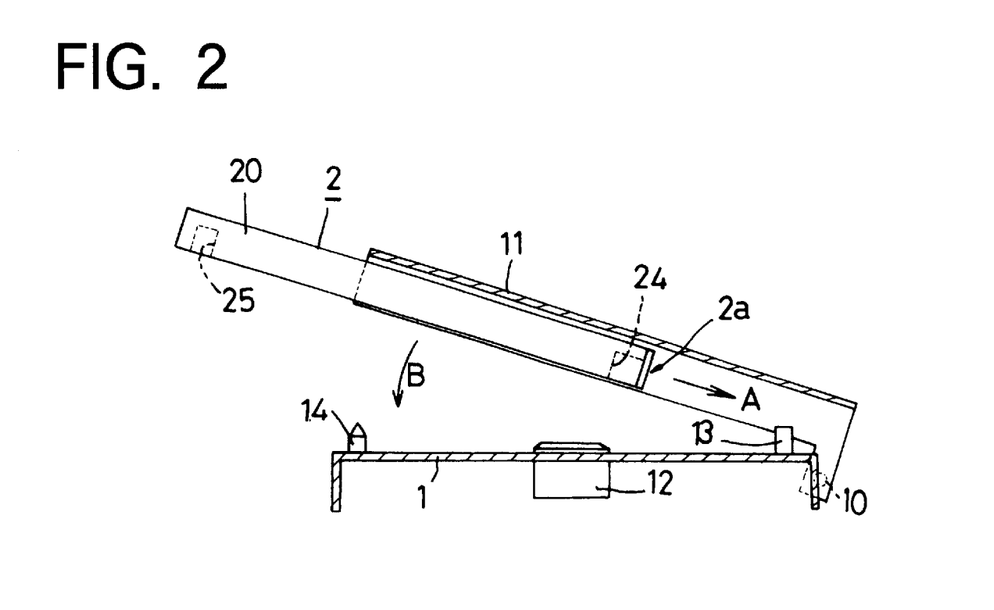
FIG. 2 is a side elevation partly broken away and showing the disk cartridge of the invention as inserted into a cartridge holder of a disk player.

As shown in FIG. 1, a disk cartridge 2 embodying the present invention comprises a flat rectangular parallelepipedal cartridge body 20 of resin, and a disk 21 rotatably enclosed in the cartridge body 20. With reference to FIG. 2, the disk cartridge 2 is inserted into a cartridge holder 11 of a disk player and then depressed, whereby the disk 21 is set in a signal recording-reproduction position.

The cartridge body 20 of the disk cartridge 2 has four peripheral walls surrounding the disk 21. Of these walls, the front wall 2a facing toward the direction of insertion is shaped in the form of a curved wall having a central portion positioned as close as possible to the outer periphery of the disk 21 and opposite side portions retracted toward a direction opposite to the direction of insertion. The opposite side walls 2b, 2c and the rear wall are planar.

A shutter 3 for opening and closing a window (indicated at 22 in FIG. 3) for exposing the signal bearing surface of the disk 21 is provided on the cartridge body 20 slidably on the side wall 2b at the right when the cartridge body 20 is seen toward the disk insertion direction A. The cartridge body 20 has a groove 28 formed in the right side wall 2b for receiving therein a member for unlocking the shutter 3, and a groove 27 formed in the left side wall 2c for preventing erroneous insertion.

Figure 3:
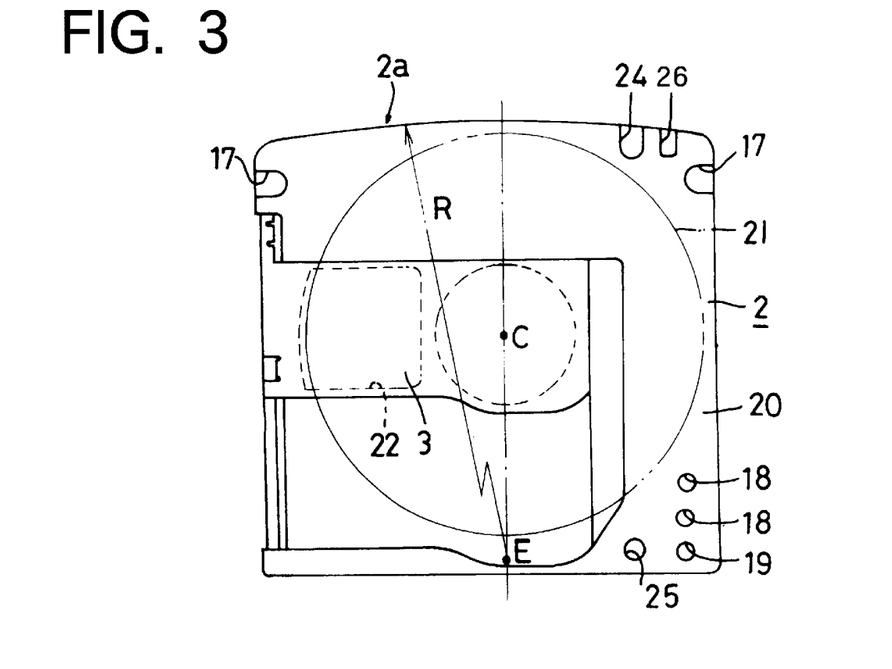
FIG. 3 is a bottom view of the disk cartridge.

The cartridge body 20 has a bottom wall which is formed with a first positioning cavity 24 and a second positioning cavity 25 positioned respectively at the front and rear ends thereof and close to the left side wall 2c for use in positioning the disk cartridge 2 in the recording-reproduction position as will be described later. The first cavity 24 has an opening in the front wall 2a and is defined by a U-shaped peripheral surface of the bottom wall extending from the wall opening toward a direction opposite to the insertion direction A. The second cavity 25 in the rear has a cylindrical inner peripheral surface as in the prior art.

Although it appears feasible to position the first and second positioning cavities 24, 25 close to the right side wall 2b of the cartridge body 20 at the front and rear end thereof, the cartridge body 20 has the shutter and means related thereto at these positions as is the case with the conventional disk cartridge 7 shown in FIGS. 10(a) and 10(b). Accordingly these cavities are arranged close to the left side wall 2c of the cartridge body 20 at the front and rear ends thereof in view of the space available.

The bottom wall of the cartridge body 20 is further formed with loading grooves 17, 17 for use in driving the disk cartridge 7 in the insertion direction, a disk sensor notch 26 for detecting the type of disk and circular cavities 18, 18, 19 for use in controlling various operations.

With reference to FIG. 2, the disk player includes a chassis 1 having mounted thereon a motor 12 for drivingly rotating the disk 21 of the disk cartridge 2. The cartridge holder 11 for setting the disk cartridge 2 in the recording-reproduction position is supported on the chassis 1 so as to be movable upward and downward about a pivot 10.

Further provided on the chassis 1 are a first positioning pin 13 and a second positioning pin 14 which are insertable into the first and second positioning cavities 24, 25, respectively. The positioning pins 13, 14 are each in the form of a solid cylinder having no directionality to be considered in installing the pins. The first positioning pin 13 has no slope at its head unlike the conventional one.

While the disk cartridge 2 as inserted into the cartridge holder 11 is being pushed further inwardly thereof, the head of the first positioning pin 13 enters the first positioning cavity 24 of the cartridge body 20 through the front opening of the cavity 24, thus permitting the inward movement of the cartridge 2. With the cartridge 2 brought to the innermost position within the cartridge holder 11, the holder 11 is depressed, whereby the first and second positioning pins 13, 14 are fitted respectively into the first and second positioning cavities 24, 25 of the cartridge body 20 to position the cartridge 2 in place.

Stated more specifically with reference to FIG. 3, the front wall 2a of the cartridge body 20 is in the form of a cylindrical wall having a center of curvature, E, on the center line of the disk 21 extending through the center of rotation, C, of the disk in a direction opposite to the insertion direction. This minimizes the clearance between the outer periphery of the disk 21 and the front wall 2a of the cartridge body 20, whereby the cartridge body 20 can be compacted.

When compared with the first positioning cavity 74 in the form of an elongated cavity and provided in the body 70 of the conventional disk cartridge 7, the U-shaped first positioning cavity 24 formed in the body 20 of the disk cartridge 2 of the invention corresponds to the conventional elongated cavity 74 which has its front end cut off by shaping the front wall 2a of the cartridge body 20 in the form of a curved wall retracted at opposite side portions thereof according to the invention as previously described.

Figure 4:
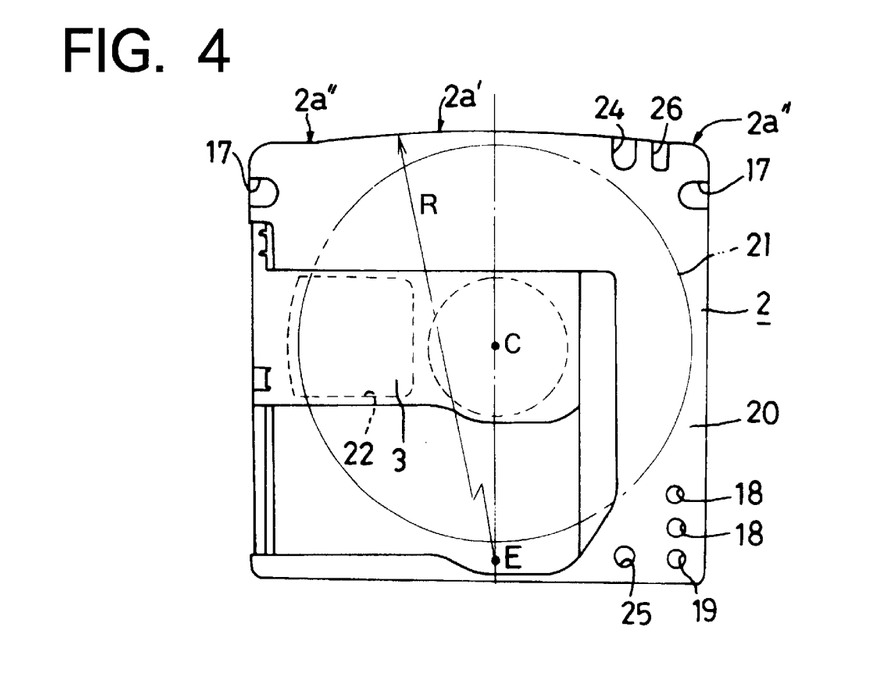
FIG. 4 is a bottom view of another disk cartridge.

The front wall 2a of the cartridge body 20 is not limited to the above-mentioned cylindrical wall but can be composed, for example, of a central cylindrical wall portion 2a' and planar wall portions 2a", 2a" at opposite sides of the portion 2a' as shown in FIG. 4. The cylindrical wall portion 2a' has a center of curvature, E, on the center line of the disk. When the front wall 2a is thus shaped, the planar wall portions 2a", 2a" of the cartridge body 20 are usable each as a portion for a stopper to come into contact with for determining the inserted limit position of the disk cartridge.

Figure 5:
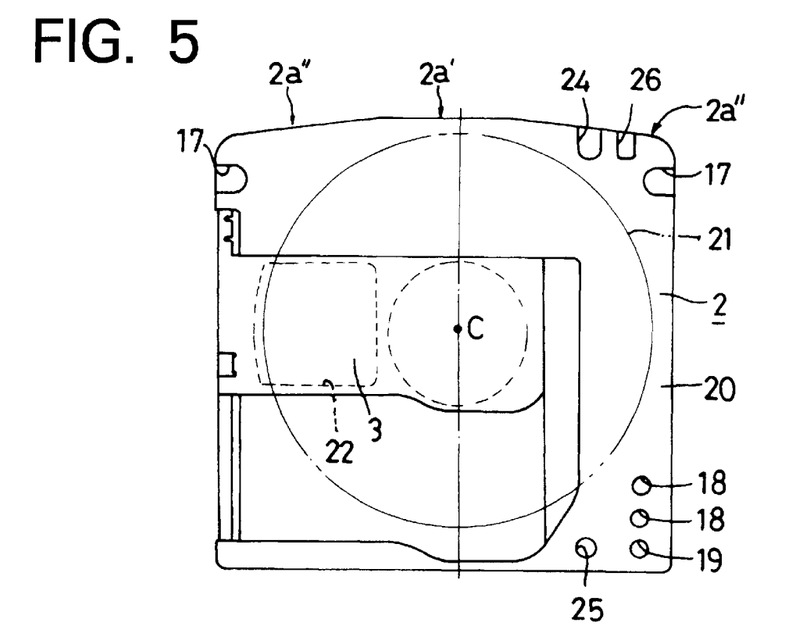
FIG. 5 is a bottom view of another disk cartridge.
Figure 6:
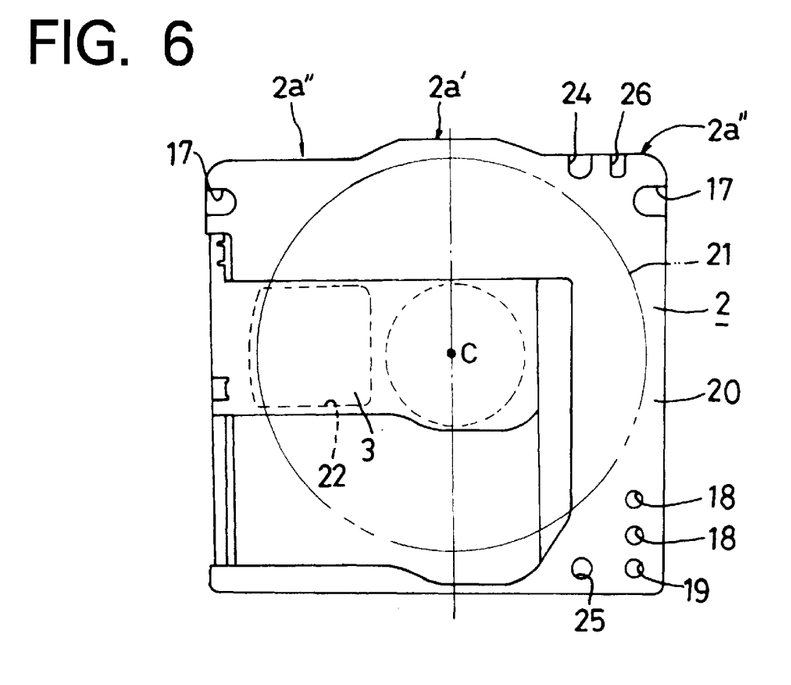
FIG. 6 is a bottom view of another disk cartridge.

Alternatively, the front wall 2a of the cartridge body 20 can be in the form of a polygonal wall comprising a central planar wall portion 2a', and slanting wall portions 2a". 2a" at opposite sides of the portion 2a' as seen in FIG. 5. As shown in FIG. 6, the front wall 2a of the cartridge body 20 can also be so shaped as to comprise a central planar wall portion 2a', and planar wall portions 2a". 2a" positioned as retracted stepwise from the portion 2a' at opposite sides thereof. A stopper contact portion can then be provided by the central portion of the front wall 2a or by each of the opposite side portions thereof.

Figure 7:
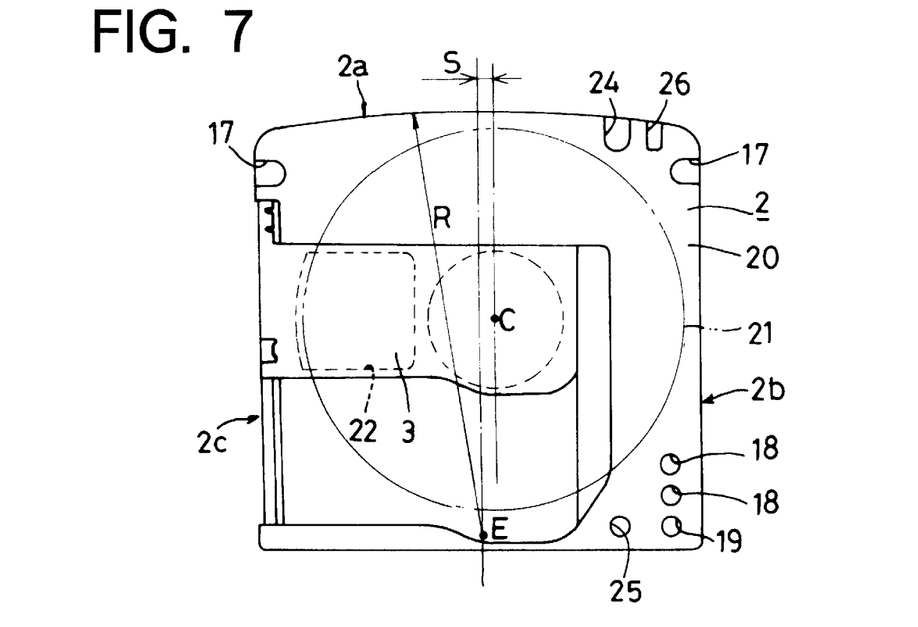
FIG. 7 is a bottom view of another disk cartridge.
Figure 8:
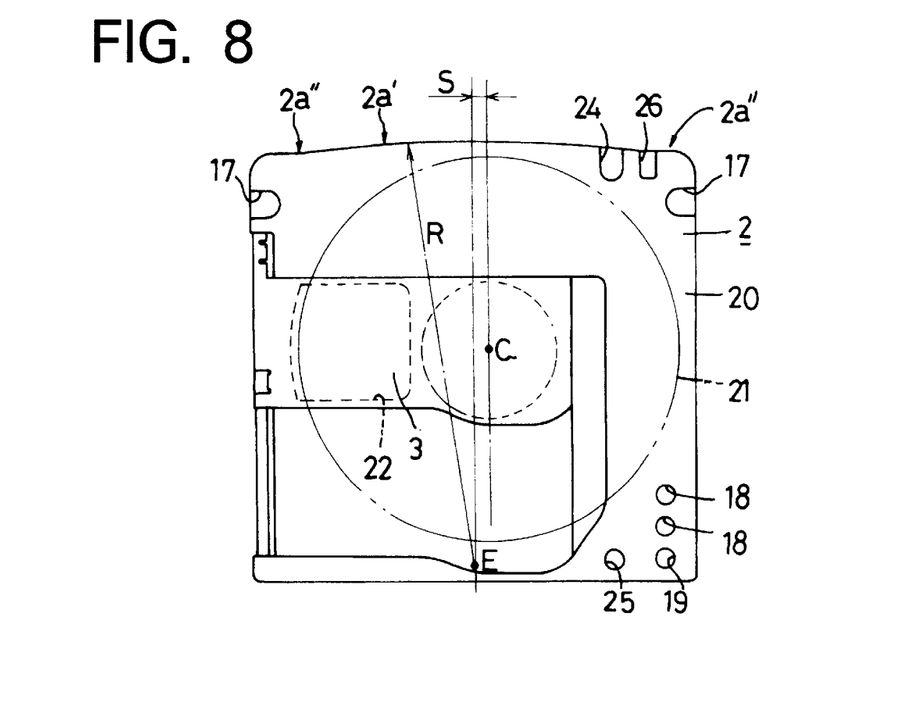
FIG. 8 is a bottom view of still another disk cartridge.

The center of curvature, E, of the front wall 2a in the form of a cylindrical wall and shown in FIG. 3 or 4 can be positioned on the center line of the cartridge which line is deflected from the disk center line toward the shutter 3 as seen in FIG. 7 or 8, respectively. This makes the cartridge body 20 symmetrical about the center line and well-balanced in shape.

With the disk cartridge 2 embodying the present invention, the front wall 2a of the cartridge body 20 is in the form of a curved wall or polygonal wall as described above and so shaped as to extend along the outer periphery of the disk 21. The disk cartridge 2 therefore has a smaller size than the conventional disk cartridge wherein the front wall is a planar wall. Since the central portion of the front wall 2a has a shape projecting toward the direction of insertion, this shape readily indicates to the user the direction of insertion into the disk player.

The first positioning cavity 24 of the cartridge body 20 is in the form of a U-shaped groove which has an opening in the front wall 2a, so that the first positioning pin 13 on the chassis 1 can be a pin which is not cut obliquely at its head and which has no directionality. This reduces the cost of the part and assembling cost.

The disk cartridge of the present invention is not limited to the foregoing embodiments in construction but can be modified variously by one skilled in the art without departing from the spirit of the invention as set forth in the appended claims.

What is claimed is:

1. A disk cartridge comprising a flat rectangular parallelepipedal cartridge body 20, and a disk 21 serving as a signal recording medium and rotatably enclosed in the cartridge body 20, the cartridge body 20 being formed with a window 22 for exposing a signal bearing surface of the disk 21 and having a shutter 3 slidably mounted thereon for opening and closing the window 22, the disk cartridge being characterized in that the cartridge body 20 comprises opposite side walls 2b, 2c formed in parallel to the direction of insertion of the disk cartridge into a signal recording-reproduction device, and a front wall 2a facing toward the direction of insertion, the shutter 3 being slidable along one of the side walls, the front wall 2a being so shaped as to extend along the arc form of an outer periphery of the disk 21 and having a central portion formed in the closest proximity to the outer periphery of the disk 21 and opposite side portions formed as retracted toward a direction opposite to the direction of insertion, the cartridge body 20 having a first Positioning cavity 24 and a second positioning cavity 25 formed in a bottom surface thereof to be opposed to a cartridge support surface of the signal recording-reproduction device and located respectively at front and rear positions along the direction of insertion, the cartridge support surface being provided with two positioning pins fitable in the respective positioning cavities, the front first positioning cavity 24 having an opening in the front wall 2a and having a U-shaped inner peripheral surface extending from the opening in the opposite direction to the direction of insertion.

2. A disk cartridge according to claim 1 wherein the front wall 2a of the cartridge body 20 is in the form of a cylindrical wall having a center of curvature on a center line of the disk 21 extending through the center of rotation of the disk in the opposite direction to the insertion direction or on a center line of the cartridge body 20 extending in parallel to the disk center line.

3. A disk cartridge according to claim 1 wherein the front wall 2a of the cartridge body 20 comprises a cylindrical wall portion having a center of curvature on a center line of the disk 21 extending through the center of rotation of the disk in the opposite direction to the insertion direction or on a center line of the cartridge body 20 extending in parallel to the disk center line, and a planar wall portion formed at each of opposite sides of the cylindrical wall portion and orthogonal to the direction of insertion.

4. A disk cartridge according to claim 1 wherein the front wall 2*a* of the cartridge body 20 comprises a central planar wall portion formed in a central portion thereof and orthogonal to the direction of insertion, and opposite side planar wall portions positioned as retracted from the central planar wall portion respectively at opposite sides thereof and orthogonal to the direction of insertion.

\* \* \* \* \*